United States Patent Office 2,933,401
Patented Apr. 19, 1960

2,933,401

PROCESS FOR PRODUCING SHAPED BODIES

Ernst Schmitz-Hillebrecht and Heinz Wolf, Krefeld, Germany, assignors to Farbenfabriken Bayer Aktiengesellschaft, Leverkusen, Germany, a corporation of Germany No Drawing. Application August 8, 1956
Serial No. 602,942

Claims priority, application Germany February 22, 1956

6 Claims. (Cl. 106—15)

In U.S.A. Patent 2,750,323, there is described a process for producing shaped bodies by bonding porous construction elements together by coating the mating surfaces of said elements with a bonding composition consisting essentially of an aqueous adhesive solution, a water-insoluble protective material dispersed in the adhesive solution, which is selected from the group consisting of fungicidal agents, insecticidal agents and mixtures thereof; and a coagulant for said adhesive solution which displaces the dispersed protective material into the pores of the construction elements at elevated temperature and pressure. The coated elements are pressed together at an elevated temperature and at superatmospheric pressure.

As glues, there may be considered the natural or synthetic glues, such as casein, hide glue, dextrine, urea-formaldehyde or phenolaldehyde condensation products and melamine resins. As preserving agents to be dispersed in the glue solutions, there may be used fungicides such as chlorinated aromatic hydrocarbons, for example chlorinated diphenyl or terphenyl, chlorinated aliphatic hydrocarbons, further phenols such as o- or p-hydroxydiphenyl, p-chloro-m-cresol, pentachlorophenol and naphthols. Insecticides such as thiophosphoric acid esters, for example p-nitrophenylthiophosphoric acid diethyl ester, dichloro-diphenyl-trichloroethane and γ-hexachloro-cyclohexane may also be used.

As coagulating agents to be added to the glue solutions according to the known process, there are proposed electrolytes, particularly those whose water-solubility is strongly temperature-dependent, for example, potassium nitrate, inorganic or organic compounds decomposing into a gaseous state at elevated temperature, for example, ammonium carbonate, ammonium bicarbonate, ammonium nitrate and guanidine carbonate, diazo compounds such as diazo-butyric acid nitril, furthermore organic amines, for example iso-hexylamine, triethylamine, mono- or diethylamino-cyclohexane and dimethylaniline, inorganic bases, for example hydrazine-hydrate and, finally, the salt-like compounds of alkylnaphthalene-sulphonic acid with organic amines, for example diisobutyl naphthalene sulphonic acid diethylamino-cyclo-hexane. Highly dispersed fillers such as powdered stones, silicium dioxide, zinc oxides, iron oxides and bleaching earths may also be used.

These agents are added to cause the initially homogeneous glue solution to separate on heating, for example when treating plywood in a hot-press, into two or three phases, namely into the bonding substance remaining in the joints, an aqueous layer, and an oily layer consisting of the preserving agents. The two latter phases of low viscosity are then easily absorbed by the porous structural elements, for example wooden plies. Thus, the preserving agents practically completely impregnate the wood.

In general, in order to form or to increase the stability of the preservative dispersions, small amounts of emulsifiers are added to the glue solutions, for example, addition products of ethylene oxide and compounds containing hydroxyl groups such as castor oil or alkylphenols, or alkali metal salts of alkylnaphthalene-sulphonic acids, for example, the sodium salt of isobutylnaphthalene-sulphonic acid.

Surprisingly, it has now been found that the use of glue solutions wherein water-insoluble preserving agents of the aforesaid kind are dispersed and containing small amounts of polyethers but not the above mentioned coagulant agents is particularly advantageous in the manufacture of the said moulded bodies.

Such polyethers, for example, the reaction products of organic compounds containing hydroxyl, amino, carboxyl or carboxylic acid amide groups such as mono- or polyhydric alcohols, phenols, ester-, ether- or amino-alcohols, substituted or unsubstituted acid amides and primary or secondary amines, with alkylene oxides, for example glycidol, propylene oxide and preferably ethylene oxide, possess, as has already been mentioned, a certain emulsifying action in the preparation of the glue solutions or preservative dispersion at room temperature. However they surprisingly lead, on heating, for example, when heating the glue layers in presses, to coagulation of the glue solutions and thus to the separation of the initially finely dispersed water-insoluble preserving agents from the glue phase and to their penetration into the porous material. The features are carried to such an extent that the addition of other coagulating agents is not necessary. Surprisingly small concentrations of the ethers, in some cases 0.1 percent (referred to the oily preserving agent), are sufficient to attain a coagulation and thus a penetration effect. The amount of polyethers to be added may, however, vary within wide limits, for example, between about 0.1 and 10 percent. Suitable instructions may easily be ascertained by tests.

Polyethers suitable for the invention are for example those obtainable from—

Dodecanol with 6 mols of ethylene oxide
Isobutylnaphthylcarbinol with 4 mols of ethylene oxide
p-Isooctylphenol with 6 mols of ethylene oxide
p-Cyclohexylphenol with 8 mols of ethylene oxide
Isobutylnaphthol with 6 mols of ethylene oxide
p-Isooctylphenol-β-δ glucoside with 5 mols of glycidol
p-Cyclohexyl-benzylalcohol with 5.25 mols of ethylene oxide
α-Methyloltetraline with 6 mols of ethylene oxide
α-Methyloltetraline with 2.6 mols of ethylene oxide
Trans-β-decalol with 6.3 mols of ethylene oxide
Trans-β-decalol with 3 mols of ethylene oxide
Benzyl-o-hydroxydiphenyl with 10 mols of ethylene oxide
Polymeric 2-ethyl-2-methylol-oxacyclobutane with 7 mols of ethylene oxide
Trimethylol propane with 35 mols of ethylene oxide
Polymeric 2-ethyl-2-methylol-oxacyclobutane with 2.75 mols of ethylene oxide
Ketal from trimethylol-propane and cyclohexane with 8 mols of ethylene oxide
Diisobutylamine with 4 mols of ethylene oxide
N-methylcyclohexylamine with 3 mols of propylene oxide
Lauric acid anilide with 6 mols of ethylene oxide
Stearic acid benzylamide with 8 mols of ethylene oxide
Benzoic acid dodecylamide with 8 mols of ethylene oxide
p-Hydroxybenzoic acid octylamide with 6 mols of ethylene oxide Propionic acid dodecylamide with 6 mols of ethylene oxide Hydroxyethylstearic acid amide with 2 mols of ethylene oxide p-Hydroxybenzyl amide of oleic acid with 12 mols of ethylene oxide p-Hydroxybenzoic acid cyclohexyl ester with 3 mols of propylene oxide Stearic acid triethanol aminoester (mono) with 12.5 mols of ethylene oxide The aforesaid polyethers which may be further modified by, for example, esterifying, etherifying or cyanoethylating the hydroxyl groups in the end-position, are generally syrupy substances which can very easily be mixed with the glue solutions. Compared with amines, for example, they are neutral and therefore do not change the pH of the glue solutions. Their indifference to metallic materials, especially to iron and copper, is of particular advantage, since there do not occur undesired changes in colour as is the case with many coagulating agents of the known process, particularly in the presence of pentachlorophenol. When such mixtures are in contact with the walls of iron or copper vessels, deep brown or red colourings occur.

Moreover, the polyethers according to the invention very easily absorb desirable preserving agents which are biologically highly active, particularly thiophosphoric acid ester in the cold glue solutions, and thus introduce these into the bonded material (for example plywood) in addition to those contained in the oily preserving agent. On account of the especially suitable dissolving conditions, easily manipulated mixtures, i.e. dispersions of glue and preserving agents, can be prepared from which the preserving agents are extensively removed during the setting of the glue and incorporated with the porous structural elements.

The following example is given for the purpose of illustrating the invention.

*Example*

160 grams of a preliminary condensation product of urea and formaldehyde are mixed with 100 grams of water and 1.8 grams of an emulsifier (e.g. the sodium salt of diisobutylnaphthalene-sulphonic acid). The viscous solution is then stirred with 26 grams of a hardener solution consisting of 45 percent of urea, 8 percent of ammonium chloride, 20 percent of water and 27 percent of a concentrated aqueous ammonia. 124 grams of this glue and hardener mixture are intimately stirred with 50 grams of an oily wood preserving agent consisting of a mixture of 20 percent of chlorinated soft-resin-like chloro-terphenyl (about 60 percent of chlorine), 76 percent of chlorinated aliphatic petroleum hydrocarbons having an average chain of 12 carbon atoms (containing 16 percent of chlorine), 3.5 percent of pentachlorophenol and 0.5 percent of p-nitrophenyl-thiophosphoric acid diethyl ester. While stirring, there is added 1 gram of a polyoxy ether of the aforesaid kind. The whole dispersion is then dyed with 0.2 gram of an oil-soluble blue dyestuff.

A Limba-foil of 3.5 millimetres thickness is coated on both sides with 180 grams per square metre each of the above dispersion and bonded with two Limba foils of 1.5 millimetres thickness under pressure.

Conditions of compression: 100° C., 7.5 minutes, 9 kilograms per square centimeter.

The finished plywood contains about 20 kilograms per cubic metre of the oily wood preserving agent.

If the dyeing on the surface of the plywood is uneven or stainy, it is advantageous to subdivide the surface into smaller squares, in order to ascertain more accurately the percentage of penetration. In the following table, the results are summarized:

| polyether basic substance | treated with ethylene oxide, mole per OH group | penetration (measured in squares), percent |
|---|---|---|
| (1) p-cyclohexylbenzylalcohol | 5.25 | 100 |
| (2) α-methyloltetraline | 6 | 70 |
| (3) α-methyloltetraline | 2.6 | 70 |
| (4) trans-β-decalol | 6.3 | 95 |
| (5) trans-β-decalol | 3 | 95 |
| (6) benzyl-o-hydroxydiphenyl | 10 | 95 |
| (7) polymeric 2-ethyl-2-methylol-oxacyclobutane | 7 | 100 |
| (8) polymeric 2-ethyl-2-methylol-oxacyclobutane | 2.75 | 95 |
| (9) ketal from trimethylolpropane and cyclohexanone | 8 | 95 |
| (10) hydroxyethylstearic acid amide | 2 | 70 |
| (11) p-hydroxybenzylamide of oleic acid | 12 | 100 |
| (12) stearic acid triethanol amino-ester (mono) | 12.5 | 95 |
| (13) trimethylolpropane | 35 | 85 |
| (14) control test without the addition of polyoxyether | | 25 |

Similar results are obtained if corresponding amounts of polyethers are used which are prepared instead of from ethylene oxide, from propylene oxide or glycidol.

The shaped bodies obtainable according to the invention such as plywood may be used e.g. as construction elements for manufacturing furniture, buildings and technical articles.

Obviously many modifications and variations of the present invention are possible in the light of the above teachings. It is, therefore, to be understood that within the scope of the appended claims the invention may be practiced otherwise than as specifically described.

We claim:

1. A bonding composition suitable for bonding porous construction elements liable to attack by biologically destructive agencies, said composition consisting essentially of an aqueous adhesive solution selected from the group consisting of casein, hide glue, dextrine, urea- and phenolaldehyde condensation products, and melamine resins, a water-insoluble protective material dispersed in the adhesive solution, said protective material being selected from the group consisting of fungicidal agents, insecticidal agents, and mixtures thereof, and a coagulant for said adhesive solution, said coagulant having the property of displacing the dispersed protective material into the pores of said construction elements when bonding the same together by the application of heat and pressure and consisting of a polyether reaction product between 2 to 35 mols of an alkylene oxide selected from the group consisting of ethylene and propylene oxide and glycidol and an organic compound containing a reactive group selected from the group consisting of hydroxyl, amino, carboxylic ester, and carboxylic acid amide.

2. The composition of claim 1 wherein the coagulant is the reaction product of ethylene oxide and p-cyclohexylbenzyl-alcohol.

3. The composition of claim 1 wherein the coagulant is the reaction product of ethylene oxide and benzyl-o-hydroxydiphenyl.

4. The composition of claim 1 wherein the coagulant is the reaction product of ethylene oxide and hydroxyethylstearic acid amide.

5. The composition of claim 1 wherein the coagulant is the reaction product of ethylene oxide and p-hydroxybenzylamide of oleic acid.

6. The composition of claim 1 wherein the coagulant is the reaction product of ethylene oxide and stearic acid triethanol amino mono-ester.

References Cited in the file of this patent

UNITED STATES PATENTS 2,750,323    Schmitz-Hillebrecht et al.    June 12, 1956